Jan. 23, 1934.  R. CHILTON  1,944,219

FLANGE CONNECTION

Filed Jan. 25, 1932

INVENTOR
ROLAND CHILTON
BY
ATTORNEY

Patented Jan. 23, 1934

1,944,219

UNITED STATES PATENT OFFICE 1,944,219

FLANGE CONNECTION

Roland Chilton, Ridgewood, N. J., assignor to Wright Aeronautical Corporation, a corporation of New York Application January 25, 1932. Serial No. 588,679

8 Claims. (285—139)

This invention relates to bolt-and-flange connections in general and more particularly to a novel means for and method of machining a nut seat and wrench clearance therein.

The invention has been primarily developed for use with the individual cylinders of radial air-cooled internal combustion aircraft engines. In such engines, a plurality of cylinders are radially arranged around a crankcase and are attached thereto. The crankcase is provided with openings within which the cylinders engage, and with studs or bolts extending from the crankcase to engage within openings formed in a circular flange springing from the cylinder wall. The flange, and hence the cylinder, is anchored by nuts screwed on the bolts to abut the outer surface of the flange. Usually, the crankcase is an aluminum alloy casting or forging, and the cylinders are of steel. The steel cylinder walls may be relatively thin, due to the high strength of the material, thus allowing the bolt circle in the flange to be relatively close to the cylinder wall, yet allowing clearance for a wrench to tighten the nuts when the latter are screwed down on the bolts. In the cylinder construction with which this invention is adapted to be used, the cylinders may be of aluminum alloy or the like. Since this material is not as strong as steel, and since it is necessary to reduce the outer diameter of the cylinder flange to a minimum (in order to have room for a sufficient number of radial cylinders on the crankcase), the subject method and structure have been evolved to provide wrench clearance for the hold-down nuts, and to maintain an adequate cylinder wall thickness or stiffness. Parts of the character used in the invention are ordinarily machined on all surfaces, to reduce weight and to make the stress factors as determinate as possible.

Objects of the invention are to provide a flanged type connection wherein a very large fillet is provided at the base of the flange and whereby the nuts may be sunk into the wall from which the flange extends so as to leave strengthening ribs between adjacent nuts, of which there are a plurality. Another object is to provide a simple and economical means for machining the nut seat and wrench clearance in one operation, which means shall be adaptable to the case where there is a projection overhanging the flange which would prevent the use of the "spot face" cutter previously used in machining the nut seat. Associated objects are to provide a machining method wherein all sharp corners and small fillets where fatigue cracks are liable to originate are avoided, and whereby the nut seat and the wrench clearance may be produced with a single cutter in one and the same operation.

Other objects and advantages of this invention will be hereinafter set forth.

Figure 1:
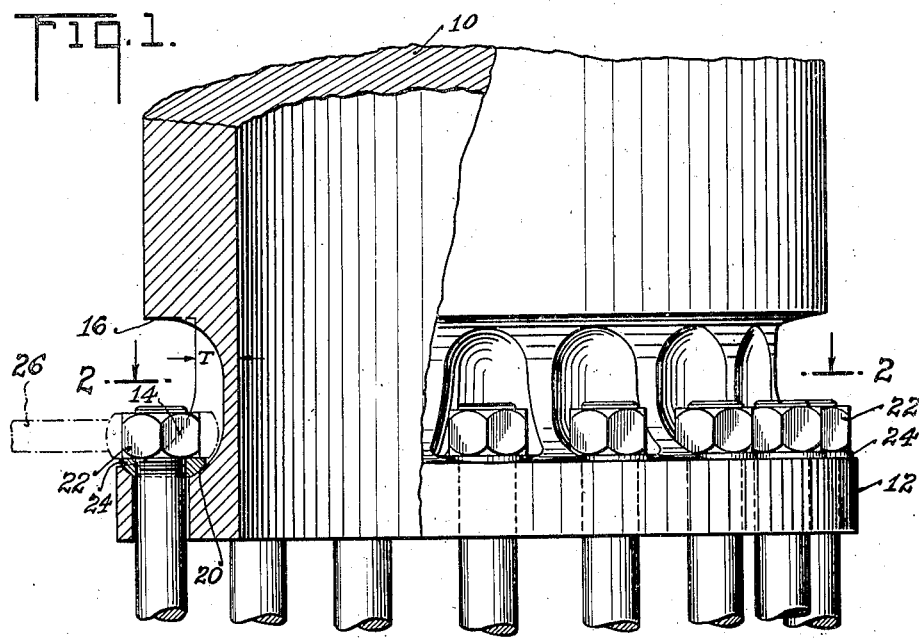
Fig. 1 is a side elevation, partly in section, of a flanged member machined in accordance with the teachings of the present invention.

Referring first to Figure 1, 10 designates the main body of the flanged member which, before the nut seats are machined, has at its lower end a thickness indicated by the dimension T, merging into the flange 12 with a large fillet 14. The upper part of the member 10 overhangs the bolt flange as indicated at 16 to thus preclude the use of the conventional spot facing operation for machining the net seats.

Figure 3:
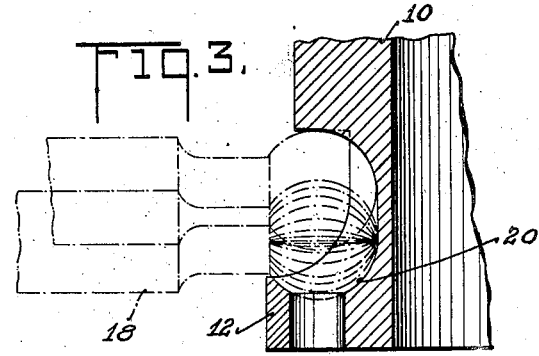
Fig. 3 is a fragmentary sectional view wherein the special cutter used is shown in dot and dash lines.

In the present invention a spherical headed cutter indicated by the dot and dash lines 18 of Fig. 3 is used. This cutter is first fed in along its axis in the upper position of Fig. 3 and then moved downwardly to produce the elongated pocket which provides wrench clearance around the nut and also to produce the spherical seat 20 in the same operation. Referring again to Fig. 1, it will be seen that each of the nuts 22 is provided with a spherical washer 24 fitted to the spherical seat 20, while the dot and dash lines 26 indicate a suitable ring type wrench.

Figure 2:
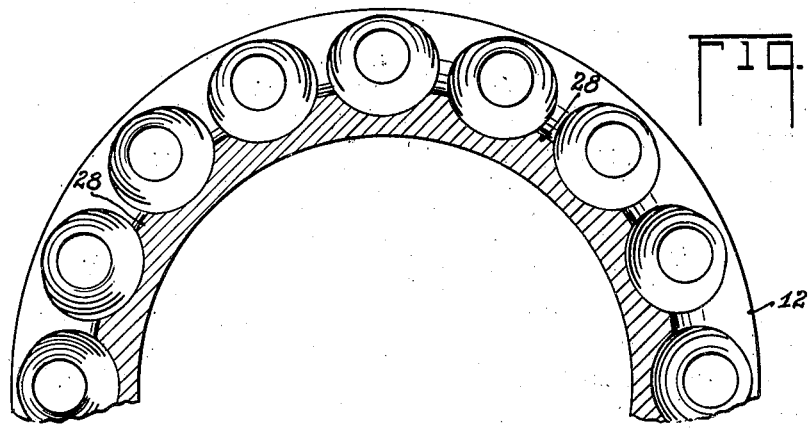
Fig. 2 is a section on the line 2—2 of Fig. 1.

Referring now to the sectional view of Fig. 2, it will be seen that this method of fabrication leaves a rib 28 between each of the nut pockets whereby the nuts may be set in closer to the wall than would be the case if equal sectional area were provided by a wall of uniform thickness. In this way the overall dimensions of the flange 12 are reduced and the overhang of this flange from the top of the ribs 28 is minimized, giving a stronger and more rigid connection and one which occupies a minimum of space.

It is to be understood that the above described embodiment of the invention is for the purpose of illustration only, and various changes may be made therein without departing from the spirit and scope of the invention.

I claim as my invention:

1. In a connection of the character described, a flange springing from a wall, said flange having a bolt hole and a spherical nut seat concentric with said hole, said wall having an arcuate pocket formed therein as a continuation of said nut seat, spherical seating means adapted for fitting engagement in said seat, and bolts adapted to engage within said hole and within said seating means.

2. In a connection of the character described, a flange springing from a wall, said flange having a plurality of spaced bolt holes, a spherical nut seat for each said hole formed concentric therewith, said wall having arcuate pockets formed as continuations of said seats, forming ribs between successive pockets for stiffening said wall, and bolts adapted to engage within said holes and within said seating means.

3. In a connection of the character described, a flange springing from a wall, said wall having a portion overhanging said flange, and spaced ribs springing from said wall and extending from said flange to said overhanging portion for forming nut pockets, and said flange having bolt holes formed therein, each said bolt hole being partly encompassed by adjacent ribs.

4. In a connection of the character described, a wall, spaced substantially parallel ribs on said wall forming with said wall a series of nut pockets, a flange springing from said wall and merging into said ribs, said flange having formed therein, at the base of each said pocket, a bolt hole with a spherical nut seat, the surface of said seat being formed to merge into the defining walls of said pocket.

5. In a connection of the character described, in combination, a wall, a series of spaced arcuate grooves formed therein, each for providing a nut clearance, a flange springing from said wall and having spherical nut seats formed therein, each said seat continuing the surface wall of one said groove, and said flange having a bolt hole formed therein concentric with each said nut seat, a bolt adapted to engage in each said hole, spherical seating means adapted for fitting engagement in each said seat, and a nut adapted to engage each said bolt and to bear on its corresponding seating means.

6. In a flange connection of the character described, a wall having a plurality of spaced arcuate grooves formed therein, defining ribs between said grooves for stiffening said wall, a flange springing from said wall having seats formed as substantial continuations of said grooves and having a through opening at the base of each said seat, nut seating means adapted to fit within said flange seats, nuts seating on said means and each lying partly within one said groove, and bolts passing through said openings on which said nuts are screwed, said grooves being spaced from said nuts in an amount sufficient to provide wrench clearance.

7. In a flange connection of the character described, a flange projecting from a wall, said flange having a substantially semi-spherical nut seat formed therein, the inner boundary surface of said seat lying within the normal outer surface of said wall, said wall having a substantially semi-circular cylindrical groove formed as an upwardly extending continuation of the inner defining surface of said nut seat, said flange having an opening at the bottom of each said seat for receiving a bolt.

8. In a flange connection of the character described, a flange projecting from a wall, said wall having a plurality of substantially parallel grooves, defining ribs between said grooves, said ribs having a width less than the width of said grooves, said grooves being extended to the plane of the surface of said flange, and said flange having a plurality of nut seats, the inner boundary of each said seat being a substantial continuation of its corresponding groove, said flange having an opening at the bottom of each said seat for receiving a bolt.

ROLAND CHILTON.